US010156118B2

(12) United States Patent
Fripp et al.

(10) Patent No.: US 10,156,118 B2
(45) Date of Patent: Dec. 18, 2018

(54) TIME-DELAY COATING FOR DISSOLVABLE WELLBORE ISOLATION DEVICES (71) Applicant: HALLIBURTON ENERGY SERVICES, INC., Houston, TX (US)

(72) Inventors: Michael L. Fripp, Carrollton, TX (US); Zachary R. Murphree, Carrollton, TX (US); Zachary W. Walton, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/435,056

(22) PCT Filed: Apr. 16, 2014

(86) PCT No.: PCT/US2014/034322
§ 371 (c)(1),
(2) Date: Apr. 10, 2015

(87) PCT Pub. No.: WO2015/160341
PCT Pub. Date: Oct. 22, 2015

(65) Prior Publication Data
US 2017/0022778 A1 Jan. 26, 2017

(51) Int. Cl.
E21B 33/12 (2006.01)
C09K 8/42 (2006.01)
(Continued)

(52) U.S. Cl.
CPC .............. E21B 33/12 (2013.01); C09K 8/426 (2013.01); E21B 29/02 (2013.01); E21B 33/134 (2013.01);
(Continued)

(58) Field of Classification Search
CPC ...... E21B 33/12; E21B 33/134; E21B 34/063; E21B 29/00; E21B 29/02; E21B 34/10; E21B 43/14; C09K 8/426
See application file for complete search history.

(56) References Cited

U.S. PATENT DOCUMENTS 7,290,609 B2 11/2007 Wardlaw et al.
7,673,692 B2 3/2010 Kunz
(Continued)

FOREIGN PATENT DOCUMENTS

WO WO2011071901 A2 6/2011

OTHER PUBLICATIONS

Australian Examination Report dated Feb. 17, 2017; Australian Application No. 2014391092.
(Continued)

Primary Examiner — Nicole Coy
(74) Attorney, Agent, or Firm — McGuireWoods LLP (57) ABSTRACT A method of removing a wellbore isolation device comprises: introducing the isolation device into the wellbore, wherein at least a portion of the wellbore isolation device comprises: a first material; and a coating, wherein the coating: completely surrounds at least the first material prior to introduction of the isolation device into the wellbore. The coating can be made from: a frangible substance that loses structural integrity after introduction of the isolation device into the wellbore via application of a force; a substance that undergoes a phase transformation at the phase transformation temperature of the substance after a period of time has elapsed since introduction of the isolation device into the wellbore; or at least an anode of a galvanic system comprising the anode, a cathode, and an electrolyte, wherein the anode undergoes galvanic dissolution after introduction of the isolation device into the wellbore.

7 Claims, 2 Drawing Sheets (51) Int. Cl.
  *E21B 29/02* (2006.01)
  *E21B 33/134* (2006.01)
  *E21B 34/06* (2006.01)
  *E21B 34/10* (2006.01)
  *E21B 43/14* (2006.01)

(52) U.S. Cl.
  CPC ............ *E21B 34/063* (2013.01); *E21B 34/10* (2013.01); *E21B 43/14* (2013.01)

(56) References Cited

U.S. PATENT DOCUMENTS

| | | | |
|---|---|---|---|
| 7,699,101 B2 * | 4/2010 | Fripp | E21B 33/1208 166/205 |
| 7,806,192 B2 | 10/2010 | Foster et al. | |
| 2005/0109087 A1 | 5/2005 | Robb et al. | |
| 2007/0044958 A1 | 3/2007 | Rytlewski et al. | |
| 2009/0107684 A1 | 4/2009 | Cooke, Jr. | |
| 2010/0270031 A1 | 10/2010 | Patel | |
| 2010/0294510 A1 | 11/2010 | Holmes | |
| 2011/0132619 A1 | 6/2011 | Agrawal et al. | |
| 2012/0080189 A1 | 4/2012 | Marya et al. | |
| 2012/0181032 A1 | 7/2012 | Naedler et al. | |
| 2013/0032357 A1 | 2/2013 | Mazyar et al. | |
| 2013/0126184 A1 | 5/2013 | Gerrard et al. | |
| 2013/0133897 A1 | 5/2013 | Baihly et al. | |
| 2013/0327540 A1 | 12/2013 | Hamid et al. | |
| 2013/0333890 A1 | 12/2013 | Dagenais et al. | |

OTHER PUBLICATIONS

Australian Examination Report No. 4 dated Aug. 1, 2017; Australian Application No. 2014391092.

European Extended Search Report dated Oct. 9, 2017; European Patent Application No. 14889505.5.

* cited by examiner

TIME-DELAY COATING FOR DISSOLVABLE WELLBORE ISOLATION DEVICES

TECHNICAL FIELD

Isolation devices and methods of removing the isolation devices are provided. The isolation device includes at least a first material that dissolves or undergoes a phase transformation. The isolation device includes a coating for delaying the dissolution or phase transformation of the first material. According to an embodiment, the isolation device is used in an oil or gas well operation.

BRIEF DESCRIPTION OF THE FIGURES

The features and advantages of certain embodiments will be more readily appreciated when considered in conjunction with the accompanying figures. The figures are not to be construed as limiting any of the preferred embodiments.

DETAILED DESCRIPTION

As used herein, the words "comprise," "have," "include," and all grammatical variations thereof are each intended to have an open, non-limiting meaning that does not exclude additional elements or steps.

It should be understood that, as used herein, "first," "second," "third," etc., are arbitrarily assigned and are merely intended to differentiate between two or more materials, isolation devices, wellbore intervals, etc., as the case may be, and does not indicate any particular orientation or sequence. Furthermore, it is to be understood that the mere use of the term "first" does not require that there be any "second," and the mere use of the term "second" does not require that there be any "third," etc.

As used herein, a "fluid" is a substance having a continuous phase that tends to flow and to conform to the outline of its container when the substance is tested at a temperature of 71° F. (22° C.) and a pressure of one atmosphere "atm" (0.1 megapascals "MPa"). A fluid can be a liquid or gas.

Oil and gas hydrocarbons are naturally occurring in some subterranean formations. In the oil and gas industry, a subterranean formation containing oil or gas is referred to as a reservoir. A reservoir may be located under land or off shore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir. The oil, gas, or water produced from a reservoir is called a reservoir fluid.

A well can include, without limitation, an oil, gas, or water production well, or an injection well. As used herein, a "well" includes at least one wellbore. A wellbore can include vertical, inclined, and horizontal portions, and it can be straight, curved, or branched. As used herein, the term "wellbore" includes any cased, and any encased, open-hole portion of the wellbore. A near-wellbore region is the subterranean material and rock of the subterranean formation surrounding the wellbore. As used herein, a "well" also includes the near-wellbore region. The near-wellbore region is generally considered to be the region within approximately 100 feet radially of the wellbore. As used herein, "into a well" means and includes into any portion of the well, including into the wellbore or into the near-wellbore region via the wellbore.

A portion of a wellbore may be an open hole or cased hole. In an open-hole wellbore portion, a tubing string may be placed into the wellbore. The tubing string allows fluids to be introduced into or flowed from a remote portion of the wellbore. In a cased-hole wellbore portion, a casing is placed into the wellbore that can also contain a tubing string. A wellbore can contain an annulus. Examples of an annulus include, but are not limited to: the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

It is not uncommon for a wellbore to extend several hundreds of feet or several thousands of feet into a subterranean formation. The subterranean formation can have different zones. A zone is an interval of rock differentiated from surrounding rocks on the basis of its fossil content or other features, such as faults or fractures. For example, one zone can have a higher permeability compared to another zone. It is often desirable to treat one or more locations within multiples zones of a formation. One or more zones of the formation can be isolated within the wellbore via the use of an isolation device to create multiple wellbore intervals. At least one wellbore interval corresponds to a formation zone. The isolation device can be used for zonal isolation and functions to block fluid flow within a tubular, such as a tubing string, or within an annulus. The blockage of fluid flow prevents the fluid from flowing across the isolation device in any direction and isolates the zone of interest. In this manner, treatment techniques can be performed within the zone of interest.

Common isolation devices include, but are not limited to, a ball and a seat, a bridge plug, a packer, a plug, and wiper plug. It is to be understood that reference to a "ball" is not meant to limit the geometric shape of the ball to spherical, but rather is meant to include any device that is capable of engaging with a seat. A "ball" can be spherical in shape, but can also be a dart, a bar, or any other shape. Zonal isolation can be accomplished via a ball and seat by dropping or flowing the ball from the wellhead onto the seat that is located within the wellbore. The ball engages with the seat, and the seal created by this engagement prevents fluid communication into other wellbore intervals downstream of the ball and seat. As used herein, the relative term "downstream" means at a location further away from a wellhead. In order to treat more than one zone using a ball and seat, the wellbore can contain more than one ball seat. For example, a seat can be located within each wellbore interval. Generally, the inner diameter (I.D.) of the ball seats is different for each zone. For example, the I.D. of the ball seats sequentially decreases at each zone, moving from the wellhead to the bottom of the well. In this manner, a smaller ball is first dropped into a first wellbore interval that is the farthest downstream; the corresponding zone is treated; a slightly larger ball is then dropped into another wellbore interval that is located upstream of the first wellbore interval; that corresponding zone is then treated; and the process continues in this fashion—moving upstream along the wellbore—until all the desired zones have been treated. As used herein, the relative term "upstream" means at a location closer to the wellhead.

A bridge plug is composed primarily of slips, a plug mandrel, and a rubber sealing element. A bridge plug can be introduced into a wellbore and the sealing element can be caused to block fluid flow into downstream intervals. A packer generally consists of a sealing device, a holding or setting device, and an inside passage for fluids. A packer can be used to block fluid flow through the annulus located between the outside of a tubular and the wall of the wellbore or inside of a casing.

Isolation devices can be classified as permanent or retrievable. While permanent isolation devices are generally designed to remain in the wellbore after use, retrievable devices are capable of being removed after use. It is often desirable to use a retrievable isolation device in order to restore fluid communication between one or more wellbore intervals. Traditionally, isolation devices are retrieved by inserting a retrieval tool into the wellbore, wherein the retrieval tool engages with the isolation device, attaches to the isolation device, and the isolation device is then removed from the wellbore. Another way to remove an isolation device from the wellbore is to mill at least a portion of the device or the entire device. Yet, another way to remove an isolation device is to contact the device with a solvent, such as an acid, thus dissolving all or a portion of the device.

However, some of the disadvantages to using traditional methods to remove a retrievable isolation device include: it can be difficult and time consuming to use a retrieval tool; milling can be time consuming and costly; and premature dissolution of the isolation device can occur. For example, premature dissolution can occur if acidic fluids are used in the well prior to the time at which it is desired to dissolve the isolation device. Therefore, dissolvable isolation devices can be used in wellbore operations. The isolation devices can include a material that dissolves or undergoes a phase transformation downhole. Examples of mechanisms by which the material can dissolve or undergo a phase transformation can include galvanic corrosion, dissolution in a solute or electrolyte, melting, and chemical reactions such as hydrolysis.

Galvanic corrosion occurs when two different metals or metal alloys are in electrical connectivity with each other and both are in contact with an electrolyte. As used herein, the phrase "electrical connectivity" means that the two different metals or metal alloys are either touching or in close enough proximity to each other such that when the two different metals are in contact with an electrolyte, the electrolyte becomes electrically conductive and ion migration occurs between one of the metals and the other metal, and is not meant to require an actual physical connection between the two different metals, for example, via a metal wire. It is to be understood that as used herein, the term "metal" is meant to include pure metals and also metal alloys without the need to continually specify that the metal can also be a metal alloy. Moreover, the use of the phrase "metal or metal alloy" in one sentence or paragraph does not mean that the mere use of the word "metal" in another sentence or paragraph is meant to exclude a metal alloy. As used herein, the term "metal alloy" means a mixture of two or more elements, wherein at least one of the elements is a metal. The other element(s) can be a non-metal or a different metal. An example of a metal and non-metal alloy is steel, comprising the metal element iron and the non-metal element carbon. An example of a metal and metal alloy is bronze, comprising the metallic elements copper and tin.

The metal that is less noble, compared to the other metal, will dissolve in the electrolyte. The less noble metal is often referred to as the anode, and the more noble metal is often referred to as the cathode. Galvanic corrosion is an electrochemical process whereby free ions in the electrolyte make the electrolyte electrically conductive, thereby providing a means for ion migration from the anode to the cathode—resulting in deposition formed on the cathode. Certain metal alloys, such as a single metal alloy containing at least 50% magnesium, can dissolve in an electrolyte without a distinct cathode being present.

A material can melt or undergo a phase transformation at the bottomhole temperature of a well. As used herein, the term "bottomhole" means at the location of the isolation device. As used herein, a "phase transformation" means any change that occurs to the physical properties of the substance. As used herein, a "phase transformation" can include, without limitation, a change in the phase of the substance (i.e., from a solid to a liquid or semi-liquid, from a liquid or semi-liquid to a gas, etc.), a glass transition, a change in the amount of crystallinity of the substance, physical changes to the amorphous and/or crystalline portions of the substance, and any combinations thereof. A substance will undergo a phase transformation at a "phase transformation temperature." As used herein, a "phase transformation temperature" includes a single temperature and a range of temperatures at which the substance undergoes a phase transformation. Therefore, it is not necessary to continually specify that the phase transformation temperature can be a single temperature or a range of temperatures throughout. By way of example, a substance will have a glass transition temperature or range of temperatures, symbolized as $T_g$. The $T_g$ of a substance is generally lower than its melting temperature $T_m$. The glass transition can occur in the amorphous regions of the substance.

The material can be a eutectic composition or a fusible alloy. A fusible alloy can also be a eutectic composition. As used herein, the term "fusible alloy" means an alloy wherein at least one phase of the alloy has a melting point below 482° F. (250° C.). A eutectic composition is a mixture of two or more substances that undergoes a phase transformation at a lower temperature than all of its pure constituent components. Stated another way, the temperature at which a eutectic composition undergoes the phase transformation is a lower temperature than any composition made up of the same substances can freeze or melt and is referred to as the transformation temperature. A solid-liquid phase transformation temperature can also be referred to as the freezing point or melting point of a substance or composition. The substances making up the eutectic composition can be compounds, such as metal alloys or thermoplastics, or metallic elements. By way of example, the melting point of bismuth at atmospheric pressure (101 kilopascals) is 520° F. (271.1° C.) and the melting point of lead is 621° F. (327.2° C.); however, the melting point of a composition containing 55.5% bismuth and 44.5% lead has a melting point of 244° F. (117.8° C.). As can be seen the bismuth-lead composition has a much lower melting point than both, elemental bismuth and elemental lead. Not all compositions have a melting point that is lower than all of the individual substances making up the composition. By way of example, a composition of silver and gold has a higher melting point compared to pure silver, but is lower than that of pure gold. Therefore, a silver-gold composition cannot be classified as a eutectic composition.

A eutectic composition can also be differentiated from other compositions because it solidifies (or melts) at a single, sharp temperature. It is to be understood that the phrases "phase transformation" and "solid-liquid phase transformation," the term "melt" and all grammatical variations thereof, and the term "freeze" and all grammatical variations thereof are meant to be synonymous. Non-eutectic compositions generally have a range of temperatures at which the composition melts. There are other compositions that can have both: a range of temperatures at which the composition melts; and a melting point less than at least one of the individual substances making up the composition. These other substances can be called hypo- and hyper-eutectic compositions. A hypo-eutectic composition contains the minor substance (i.e., the substance that is in the lesser concentration) in a smaller amount than in the eutectic composition of the same substances. A hyper-eutectic composition contains the minor substance in a larger amount than in the eutectic composition of the same substances. Generally, with few exceptions, a hypo- and hyper-eutectic composition will have a solid-liquid phase transformation temperature higher than the eutectic transformation temperature but less than the melting point of at least one of the individual substances making up the composition.

Certain wellbore operations require zonal isolation for extended periods of time, for example for up to one month or more. Depending on the material that dissolves or undergoes the phase transformation, the isolation device may not remain intact for the necessary length of time. Therefore, a need exists for an isolation device that can remain intact and provide zonal isolation for a desired period of time. After the desired period of time, there is a need for the material of the isolation device to dissolve or undergo a phase transformation such that zonal isolation is no longer accomplished.

It has been discovered that a material making up an isolation device that dissolves or undergoes a phase transformation can be surrounded with a coating. The coating can be designed as a frangible coating or to undergo a phase transformation downhole after a desired period of time. The frangible coating loses structural integrity upon a force being applied to the coating. As used herein, the phrase "loses structural integrity" means any structural damage whereby a fluid can contact the material located underneath the coating-including, but not limited to, degrade, break, crack, shatter, split, fracture, and rupture. After the coating undergoes the phase transformation or loses structural integrity, the underlying material is able to dissolve or undergo its own phase transformation and thus, the isolation device can then be removed from the wellbore to restore fluid communication between wellbore intervals.

According to an embodiment, a method of removing a wellbore isolation device comprises: introducing the isolation device into the wellbore, wherein at least a portion of the wellbore isolation device comprises: (A) a first material; and (B) a coating, wherein the coating: (i) completely surrounds at least the first material prior to introduction of the isolation device into the wellbore; (ii) is made from a frangible substance; and (iii) loses structural integrity after introduction of the isolation device into the wellbore via application of a force; and causing or allowing at least the portion of the first material to dissolve or undergo a phase transformation in the wellbore.

According to another embodiment, a method of removing a wellbore isolation device comprises: introducing the isolation device into the wellbore, wherein at least a portion of the wellbore isolation device comprises: (A) a first material; and (B) a coating, wherein the coating: (i) completely surrounds at least the first material prior to introduction of the isolation device into the wellbore; (ii) is made from a substance that undergoes a phase transformation at the phase transformation temperature of the substance; and (iii) undergoes the phase transformation after a period of time has elapsed since introduction of the isolation device into the wellbore; and causing or allowing at least the portion of the first material to dissolve or undergo a phase transformation in the wellbore.

According to another embodiment, a method of removing a wellbore isolation device comprises: introducing the isolation device into the wellbore, wherein at least a portion of the wellbore isolation device comprises: (A) a first material; and (B) a coating, wherein the coating: (i) completely surrounds at least the first material prior to introduction of the isolation device into the wellbore; and (ii) comprises at least an anode of a galvanic system comprising the anode, a cathode, and an electrolyte, wherein the anode undergoes galvanic dissolution after introduction of the isolation device into the wellbore; and causing or allowing at least the portion of the first material to undergo a phase transformation in the wellbore.

Any discussion of the isolation device is intended to apply to all of the method embodiments.

Figure 1:
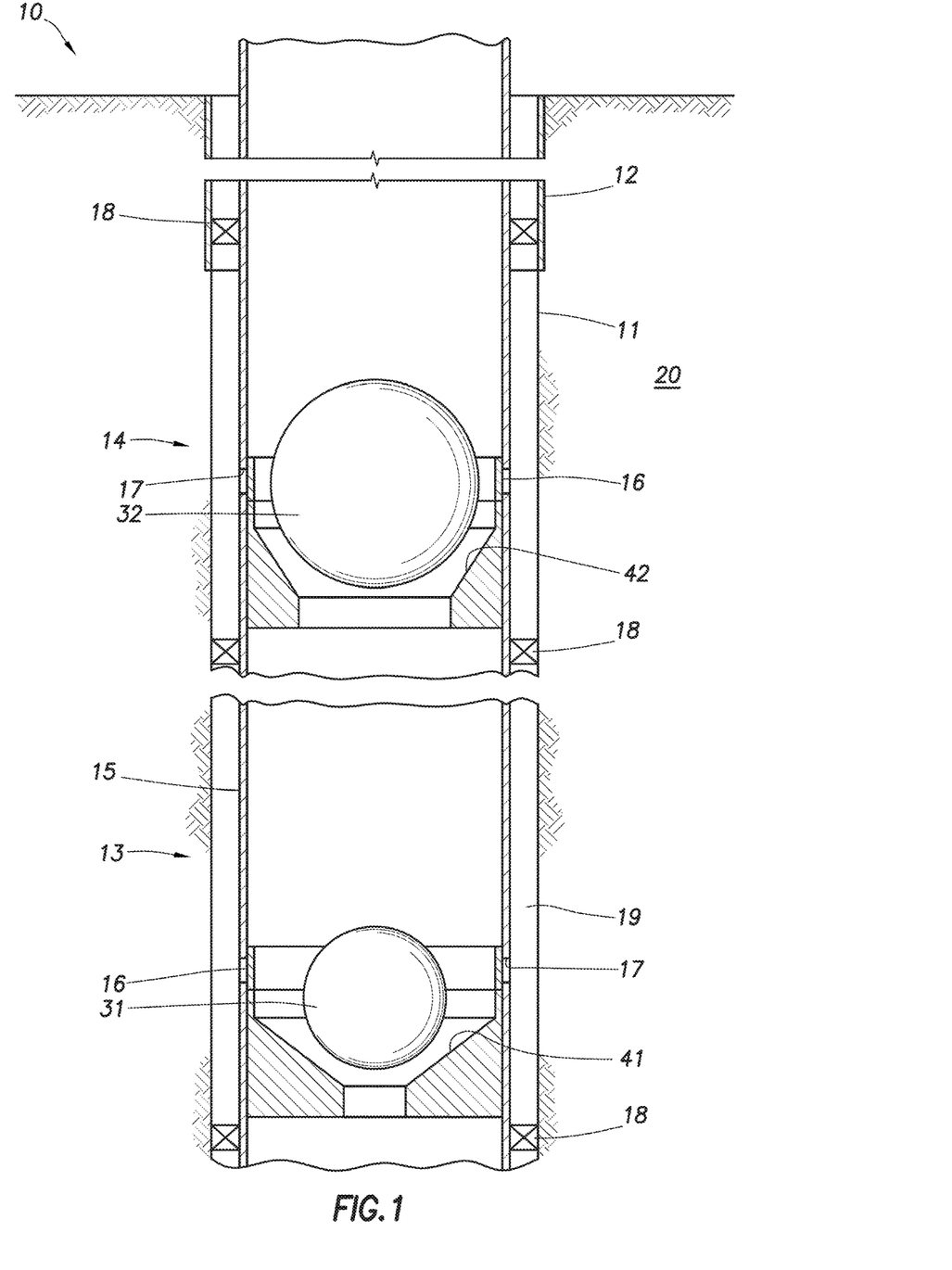
FIG. 1 depicts a well system containing more than one isolation device.

Turning to the Figures, FIG. 1 depicts a well system 10. The well system 10 can include at least one wellbore 11. The wellbore 11 can penetrate a subterranean formation 20. The subterranean formation 20 can be a portion of a reservoir or adjacent to a reservoir. The wellbore 11 can include a casing 12. The wellbore 11 can include only a generally vertical wellbore section or can include only a generally horizontal wellbore section. A tubing string 15 can be installed in the wellbore 11. The well system 10 can comprise at least a first wellbore interval 13 and a second wellbore interval 14. The well system 10 can also include more than two wellbore intervals, for example, the well system 10 can further include a third wellbore interval, a fourth wellbore interval, and so on. At least one wellbore interval can correspond to a zone of the subterranean formation 20. The well system 10 can further include one or more packers 18. The packers 18 can be used in addition to the isolation device to create the wellbore intervals and isolate each zone of the subterranean formation 20. The isolation device can be the packers 18. The packers 18 can be used to prevent fluid flow between one or more wellbore intervals (e.g., between the first wellbore interval 13 and the second wellbore interval 14) via an annulus 19. The tubing string 15 can also include one or more ports 17. One or more ports 17 can be located in each wellbore interval. Moreover, not every wellbore interval needs to include one or more ports 17. For example, the first wellbore interval 13 can include one or more ports 17, while the second wellbore interval 14 does not contain a port. In this manner, fluid flow into the annulus 19 for a particular wellbore interval can be selected based on the specific oil or gas operation.

It should be noted that the well system 10 is illustrated in the drawings and is described herein as merely one example of a wide variety of well systems in which the principles of this disclosure can be utilized. It should be clearly understood that the principles of this disclosure are not limited to any of the details of the well system 10, or components thereof, depicted in the drawings or described herein. Furthermore, the well system 10 can include other components not depicted in the drawing. For example, the well system 10 can further include a well screen. By way of another example, cement may be used instead of packers 18 to aid the isolation device in providing zonal isolation. Cement may also be used in addition to packers 18.

According to an embodiment, the isolation device is capable of restricting or preventing fluid flow between a first wellbore interval 13 and a second wellbore interval 14. The first wellbore interval 13 can be located upstream or downstream of the second wellbore interval 14. In this manner, depending on the oil or gas operation, fluid is restricted or prevented from flowing downstream or upstream into the second wellbore interval 14. Examples of isolation devices capable of restricting or preventing fluid flow between zones include, but are not limited to, a ball and seat, a plug (such as a frac plug used in hydraulic fracturing operation), a bridge plug, a wiper plug, a packer, and a plug in a base pipe. A detailed discussion of using a plug in a base pipe can be found in U.S. Pat. No. 7,699,101 issued to Michael L. Fripp, Haoyue Zhang, Luke W. Holderman, Deborah Fripp, Ashok K. Santra, Anindya Ghosh on Apr. 20, 2010 and is incorporated herein in its entirety for all purposes. If there is any conflict in the usage of a word or phrase herein and any paper incorporated by reference, the definitions contained herein control. The portion of the isolation device that includes the first material can be the mandrel of a packer or plug, a spacer ring, a slip, a wedge, a retainer ring, an extrusion limiter or backup shoe, a mule shoe, a ball, a flapper, a ball seat, a sleeve, or any other downhole tool or component of a downhole tool used for zonal isolation.

As depicted in the drawings, the isolation device can be a ball 30 (e.g., a first ball 31 or a second ball 32) or a seat 40 (e.g., a first seat 41 or a second seat 42). The ball 30 can engage the seat 40. The seat 40 can be located on the inside of a tubing string 15. The inner diameter (I.D.) of the first seat 41 can be less than the I.D. of the second seat 42. In this manner, a first ball 31 can be dropped or flowed into wellbore. The first ball 31 can have a smaller outer diameter (O.D.) than the second ball 32. The first ball 31 can engage the first seat 41. Fluid can now be temporarily restricted or prevented from flowing into any wellbore intervals located downstream of the first wellbore interval 13. In the event it is desirable to temporarily restrict or prevent fluid flow into any wellbore intervals located downstream of the second wellbore interval 14, then the second ball 32 can be dropped or flowed into the wellbore and will be prevented from falling past the second seat 42 because the second ball 32 has a larger O.D. than the I.D. of the second seat 42. The second ball 32 can engage the second seat 42. The ball (whether it be a first ball 31 or a second ball 32) can engage a sliding sleeve 16 during placement. This engagement with the sliding sleeve 16 can cause the sliding sleeve to move; thus, opening a port 17 located adjacent to the seat. The port 17 can also be opened via a variety of other mechanisms instead of a ball. The use of other mechanisms may be advantageous when the isolation device is not a ball. After placement of the isolation device, fluid can be flowed from, or into, the subterranean formation 20 via one or more opened ports 17 located within a particular wellbore interval. As such, a fluid can be produced from the subterranean formation 20 or injected into the formation.

Figure 2:
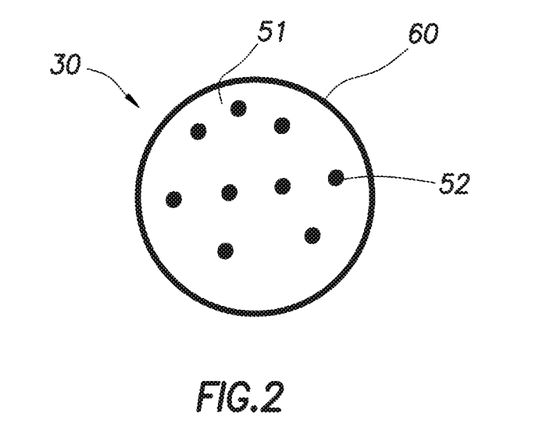
FIG. 2 depicts an isolation device containing a first and second material and a coating.
Figure 3:
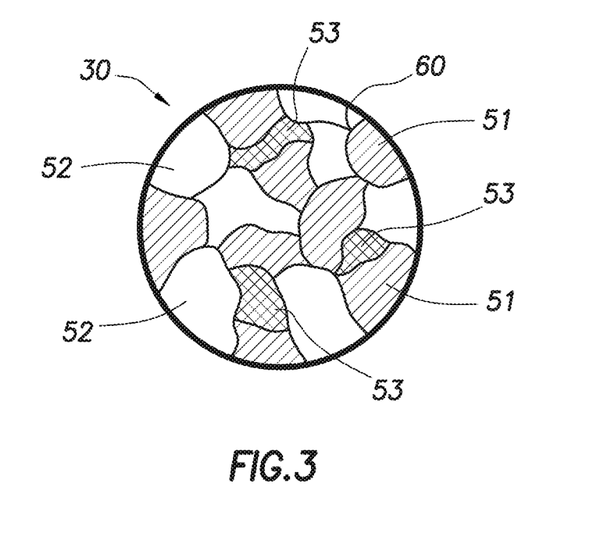
FIG. 3 depicts an isolation device containing a first, second, and third material and a coating.

Referring to FIGS. 2-3, at least a portion of the isolation device comprises at least a first material 51. The first material 51 can dissolve or undergo a phase transformation in the wellbore. The first material 51 can be a metal, metal alloy, the anode of a galvanic system, a eutectic composition, a hyper- or hypo-eutectic composition, a thermoplastic, polymeric wax, or a fusible alloy. The first material can dissolve via galvanic dissolution, dissolution in a suitable solvent, hydrolysis, or any other chemical reaction, such as dissolution in an electrolyte without a distinct cathode being present or hydrolytic dissolution of polymer bonds. The first material 51 can also undergo a phase transformation, for example when the first material is a eutectic composition, a hyper- or hypo-eutectic composition, a thermoplastic, polymeric wax, or a fusible alloy. The metal or metal of the metal alloy can be selected from the group consisting of, lithium, sodium, potassium, rubidium, cesium, beryllium, calcium, strontium, barium, radium, aluminum, gallium, indium, tin, thallium, lead, bismuth, scandium, titanium, vanadium, chromium, manganese, thorium, iron, cobalt, nickel, copper, zinc, yttrium, zirconium, niobium, molybdenum, ruthenium, rhodium, palladium, praseodymium, silver, cadmium, lanthanum, hafnium, tantalum, tungsten, terbium, rhenium, osmium, iridium, platinum, gold, neodymium, gadolinium, erbium, oxides of any of the foregoing, graphite, carbon, silicon, boron nitride, and any combinations thereof. Preferably, the metal or metal of the metal alloy is selected from the group consisting of magnesium, aluminum, zinc, beryllium, tin, iron, nickel, copper, oxides of any of the foregoing, and combinations thereof.

The portion of the isolation device can further include a second material. The second material 52 can be the cathode of a galvanic system, a filler material, a strengthening material, an electrolytic compound (i.e., a compound that forms an electrolyte upon dissolution in a solvent), a buffering agent, or combinations thereof. The first material 51 can form a matrix of the portion of the isolation device. It is to be understood that the entire isolation device, for example, when the isolation device is a ball or ball seat, can be made of at least the first material. Moreover, only one or more portions of the isolation device can be made from at least the first material. As can be seen in FIGS. 2-3, the second material 52 can be in the form of pieces. The exact number or concentration of the pieces of the second material 52 can be selected and adjusted to control the dissolution rate of the first material 51 such that at least the portion of the first material 51 dissolves in a desired amount of time. For example when the second material is the cathode, an electrolytic compound, or buffering agent, then the higher the concentration of pieces of second material 52 generally the faster the rate of dissolution of the first material.

According to an embodiment and as shown in FIG. 3, a third material 53 is included in the portion of the isolation device. The third material 53 can be a filler material or a strengthening material. The third material 53 as a filler material or strengthening material can be selected from the group consisting of sand, plastic granules, ceramic granules, ceramic beads, fibers, whiskers, woven materials, ceramic microspheres, hollow glass microspheres, and combinations thereof. For use as a filler material, the third material 53 can physically separate the boundaries of pieces of first material 51 and second material 52. This embodiment may be useful when the first material is the anode and the second material is the cathode of a galvanic system to control the rate of galvanic dissolution of the first material. The third material can also be a bonding agent for bonding the pieces of the second material to the pieces of the first material 51 or into the matrix of the first material. As a bonding agent, the third material could also be an oxide coating, a metallic oxide, or a ceramic oxide.

The pieces of the second material 52 and/or the third material 53 can be uniformly or non-uniformly distributed throughout the portion of the isolation device. The size, shape, and distribution pattern of the second material 52 and/or third material 53 can be used to help control the rate of dissolution of the first material 51.

The portion of the wellbore isolation device also includes the coating 60. The coating completely surrounds at least the first material 51 (and optionally the second material 52 and/or the third material 53) prior to introduction of the isolation device 30 into the wellbore 11. The coating is preferably non-porous prior to introduction of the isolation device into the wellbore. The coating is more preferably non-porous for a period of time after introduction into the wellbore. At least a portion of the coating no longer surrounds the first material after introduction into the wellbore. The specific examples of how the coating no longer surrounds the first material (e.g., via losing structural integrity, dissolving, or undergoing a phase transformation) are discussed in more detail below. According to an embodiment, a fluid is substantially inhibited and preferably prevented from coming in contact with at least the first material 51 prior to and during introduction of the isolation device into the wellbore. However, after the coating no longer surrounds at least the first material 51, a fluid would be able to contact at least the first material. In this manner, once the coating no longer surrounds the first material, the first material 51 is able to dissolve (e.g., via dissolution, galvanic corrosion, dissolution in an electrolyte without a distinct cathode being present, etc.) or undergo a phase transformation. Accordingly, after the first material 51 dissolves or undergoes the phase transformation, the isolation device no longer provides zonal isolation and fluid communication can be restored between wellbore intervals. Portions, or all, of the isolation device can then also be removed after the first material 51 dissolves or undergoes the phase transformation. It should be understood that the first material may have already undergone its phase transformation prior to the coating 60 no longer surrounding the first material, for example if the first material has a relatively low phase transformation temperature. However, the coating 60 should be sufficiently strong in this example to allow the isolation device to withstand downhole pressures for a desired period of time.

According to a first embodiment, the coating is made from a frangible substance. The frangible substance can be selected from ceramic materials (e.g., alumina, zirconia, titania, etc.), glasses (e.g., borate), or polymers (e.g., poly(methyl methacrylate) "PMMA" and polystyrene). The frangible coating loses structural integrity after introduction of the isolation device into the wellbore via application of a force. The thickness of the frangible coating can also be selected such that the coating loses structural integrity after introduction, where a minimum thickness is needed to prevent premature loss of structural integrity and contact of the first material with a fluid, and a maximum thickness is needed to allow for the force to cause a loss of structural integrity. The force can be the impact of a ball landing on a ball seat or frac plug, the shifting of a mandrel during setting of a plug or packer, or the thermal expansion of the first, second, and/or third materials. The force can be abrasion from a secondary action such as the fluidic abrasion from a water jet tool or the mechanical abrasion from a wire brush tool. It is to be understood that the force is not meant to include bottomhole pressures of the subterranean formation. Thermal expansion of the material(s) can occur, for example, during steam-assisted gravity drainage or other steam injection operations. The thermal expansion can cause the coating to lose structural integrity when the coefficient of thermal expansion is different for the first, second, and/or third materials compared to the coating. In this manner, the first, second, and/or third materials can undergo expansion (i.e., an increase in volume), which causes a force to be applied to the inside surface of the unexpanded coating. The methods can include causing the coating to lose structural integrity after introduction of the isolation device into the wellbore. The step of causing can include flowing a ball into the wellbore to engage with a ball seat or frac plug, actuation of a setting mechanism for a packer or other types of plugs, and cessation of pumping a fluid having a lower temperature than the subterranean formation.

According to a second embodiment, the coating 60 is made from a substance that undergoes a phase transformation at the phase transformation temperature of the substance. The substance can be selected from a eutectic composition, a hyper- or hypo-eutectic composition, a thermoplastic, polymeric wax, or a fusible alloy. The coating undergoes the phase transformation after a period of time has elapsed since introduction of the isolation device into the wellbore. The period of time can be at least 2 days. The period of time can also be in the range of about 2 days to about 2 months or from about 2 days to about 2 weeks. The methods can further include causing or allowing the temperature surrounding the isolation device to increase to a temperature greater than or equal to the phase transformation of the substance making up the coating 60. The phase transformation temperature can be the bottomhole temperature of the wellbore. According to this embodiment, after the period of time has elapsed, a fluid having a lower temperature than the subterranean formation can cease to be pumped. The temperature surrounding the isolation device can then increase to the bottomhole temperature of the subterranean formation and the coating can then undergo the phase transformation. By way of another example, after the period of time has elapsed, a heated fluid can be pumped into the wellbore, wherein the temperature of the heated fluid is greater than or equal to the phase transformation temperature of the substance making up the coating 60. In this manner, the coating can then undergo the phase transformation. For a first material 51 that undergoes a phase transformation, the phase transformation temperature of the substance making up the coating 60 can be greater than or less than the phase transformation temperature of the first material 51. In this manner, the first material 51 may already have undergone its phase transformation prior to the substance of the coating 60 undergoing its phase transformation. The first material 51 can also undergo its phase transformation after the substance of the coating 60 undergoes its phase transformation.

According to a third embodiment, the coating 60 comprises at least the anode of a galvanic system comprising the anode, a cathode, and an electrolyte. The coating 60 can also comprise the cathode of the galvanic system. The cathode of the galvanic system can also be located nearby, for example as part of a ball seat, tubing string, or other component of the isolation device, provided the anode and cathode are in electrical connectivity with one another. According to this embodiment, the anode dissolves after introduction of the isolation device into the wellbore. The anode dissolves via galvanic corrosion. According to another embodiment, the coating 60 comprises a metal alloy in which the metal alloy dissolves in an electrolyte without a distinct cathode being present. An example of this embodiment is a metal alloy containing at least 50% magnesium. The anode or the metal alloy can also dissolve after the period of time has elapsed since introduction of the isolation device into the wellbore. The desired period of time is discussed above. The methods can include causing or allowing the anode and cathode to come in contact with an electrolyte. The electrolyte can be pumped into the wellbore or the electrolyte could be a reservoir fluid that is produced into the wellbore to come in contact with the anode and cathode. The methods can further include contacting the anode and cathode with more than one electrolyte.

The methods include causing or allowing at least the portion of the first material 51 to undergo the phase transformation in the wellbore 11. The step of causing can include introducing a heated fluid into the wellbore. The step of allowing can include a cessation of pumping a cooling fluid into the wellbore and allowing the bottomhole temperature to increase to the subterranean formation temperature.

According to certain embodiments, the methods can include causing or allowing at least the portion of the first material to dissolve in the wellbore instead of undergoing the phase transformation. The methods can further include introducing an electrolyte or solvent into the wellbore. The step of allowing can include allowing a reservoir fluid to come in contact with the first material, wherein the reservoir fluid is an electrolyte or solvent for the first material.

The step of causing or allowing can be performed after the step of introducing the isolation device into the wellbore. The step of causing or allowing can also be performed after the coating no longer surrounds at least the first material. In this manner, the coating delays the dissolution or phase transformation of at least the first material 51. According to an embodiment, at least the portion of the first material dissolves or undergoes the phase transformation in a desired amount of time. The desired amount of time can be relatively quickly, especially when compared to how long it takes the coating to dissolve or undergo its phase transformation. Accordingly, it may be desirable for the first material to dissolve or undergo the phase transformation in less than 30 minutes so fluid communication can be restored between wellbore intervals in a timely manner. This way, once it is desirable to restore fluid communication, operators at the surface do not have to wait for long periods of time waiting for the portion of the first material to dissolve or undergo phase transformation.

The rate of dissolution of the first material 51 and/or the coating 60 can be controlled using a variety of factors. Such factors can include the concentration of the electrolyte. As used herein, an electrolyte is any substance containing free ions (i.e., a positive- or negative-electrically charged atom or group of atoms) that make the substance electrically conductive. The electrolyte can be selected from the group consisting of, solutions of an acid, a base, a salt, and combinations thereof. A salt can be dissolved in water, for example, to create a salt solution. Common free ions in an electrolyte include sodium ($Na^+$), potassium ($K^+$), calcium ($Ca^{2+}$), magnesium ($Mg^{2+}$), chloride ($Cl^{31}$), hydrogen phosphate ($HPO_4^{2-}$), and hydrogen carbonate ($HCO_3^-$). The concentration (i.e., the total number of free ions available in the electrolyte) of the electrolyte can be adjusted to control the rate of dissolution of the first material 51. According to an embodiment, the concentration of the electrolyte is selected such that at least the portion of the first material 51 and/or the coating 60 dissolves in a desired amount of time. Moreover, because the free ions in the electrolyte enable the electrochemical reaction to occur between the anode and cathode by donating its free ions, the number of free ions will decrease as the reaction occurs. At some point, the electrolyte may be depleted of free ions if there is any remaining un-reacted anode and cathode. If this occurs, the galvanic corrosion that causes the anode to dissolve will stop. In this example, it may be necessary to cause or allow the first material and/or coating to come in contact with a second, third, or fourth, and so on, electrolyte.

Other factors that can affect the rate of galvanic corrosion include the distance separating the metals on the galvanic series chart or the difference between the anodic indices of the metals. Yet another factor that can affect the rate of galvanic corrosion is the total amount of surface area of the anodic metal. The greater the surface area of the anode that can come in contact with the electrolyte, the faster the rate of corrosion. The cross-sectional size of the anodic metal pieces can be decreased in order to increase the total amount of surface area per total volume of the material. Yet another factor that can affect the rate of galvanic corrosion is the ambient temperature and pressure. Depending on the electrolyte chemistry and the two metals, the corrosion rate can be slower at lower temperatures and higher pressures than at higher temperatures and lower pressures.

According to an embodiment, the isolation device and the coating are capable of withstanding a specific pressure differential for a desired amount of time. As used herein, the term "withstanding" means that the isolation device does not crack, break, or collapse. The pressure differential can be the downhole pressure of the subterranean formation 20 across the device. As used herein, the term "downhole" means the location of the wellbore where the portion of the isolation device is located. Formation pressures can range from about 1,000 to about 30,000 pounds force per square inch (psi) (about 6.9 to about 206.8 megapascals "MPa"). The pressure differential can also be created during oil or gas operations. For example, a fluid, when introduced into the wellbore 11 upstream or downstream of the substance, can create a higher pressure above or below, respectively, of the isolation device. Pressure differentials can range from 100 to over 10,000 psi (about 0.7 to over 68.9 MPa). According to another embodiment, the isolation device and the coating are capable of withstanding the specific pressure differential for the desired amount of time. The desired amount of time can be at least 30 minutes. The desired amount of time can also be in the range of about 30 minutes to 2 months.

The step of introducing the isolation device can include positioning the isolation device in the wellbore 11 and/or setting the isolation device in the wellbore. More than one isolation device can also be introduced in multiple portions of the wellbore. The methods can further include the step of removing all or a portion of the coating 60 and first material 51 (and optionally the second material 52 or the third material 53) after the substance and coating have dissolved or undergone the phase transformation. According to an embodiment, a sufficient amount of the first material 51 dissolves or undergoes the phase transformation such that the isolation device is capable of being flowed from the wellbore 11. According to this embodiment, the isolation device should be capable of being flowed from the wellbore via dissolution of the first material 51, without the use of a milling apparatus, retrieval apparatus, or other such apparatus commonly used to remove isolation devices. According to another embodiment, a sufficient amount of the first material 51 dissolves or undergoes the phase transformation such that the isolation device no longer creates the wellbore intervals and fluid is not restricted or prevented from flowing within the wellbore or annulus.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A method of removing a wellbore isolation device comprising: introducing the isolation device into the wellbore, wherein the wellbore isolation device comprises:
   (A) a first material forming a matrix of a portion of the isolation device;
   (B) a second material disposed within the first material and selected from the group consisting of a cathode of a galvanic system, a filler material, a strengthening material, an electrolytic compound, a buffering agent, and any combination thereof; and
   (C) a coating, wherein the coating:
      (i) completely surrounds at least the first material prior to introduction of the isolation device into the wellbore; and
      (ii) comprises at least an anode of the galvanic system comprising the anode, a cathode, and an electrolyte, wherein the anode undergoes galvanic dissolution after introduction of the isolation device into the wellbore; and causing or allowing the first material to undergo a phase transformation at the phase transformation temperature in the wellbore.

2. The method according to claim 1, wherein the isolation device restricts or prevents fluid flow between a first wellbore interval and a second wellbore interval.

3. The method according to claim 1, wherein isolation device is a ball and a seat, a plug, a bridge plug, a wiper plug, a packer, or a plug for a base pipe.

4. The method according to claim 1, wherein the first material is a eutectic composition, a hyper- or hypo-eutectic composition, a thermoplastic, polymeric wax, or a fusible alloy.

5. The method according to claim 1, wherein the coating substantially inhibits or prevents a fluid from coming in contact with at least the first material prior to and during introduction of the isolation device into the wellbore.

6. The method according to claim 1, wherein the coating further comprises the cathode of the galvanic system.

7. The method according to claim 1, further comprising causing or allowing the anode and cathode to come in contact with the electrolyte.

* * * * *